3,357,748
MATERIAL FEED REGULATOR
Herbert S. Lenhart, Allentown, Pa., assignor to Fuller Company, a corporation of Delaware
Filed July 22, 1966, Ser. No. 567,122
1 Claim. (Cl. 302—29)

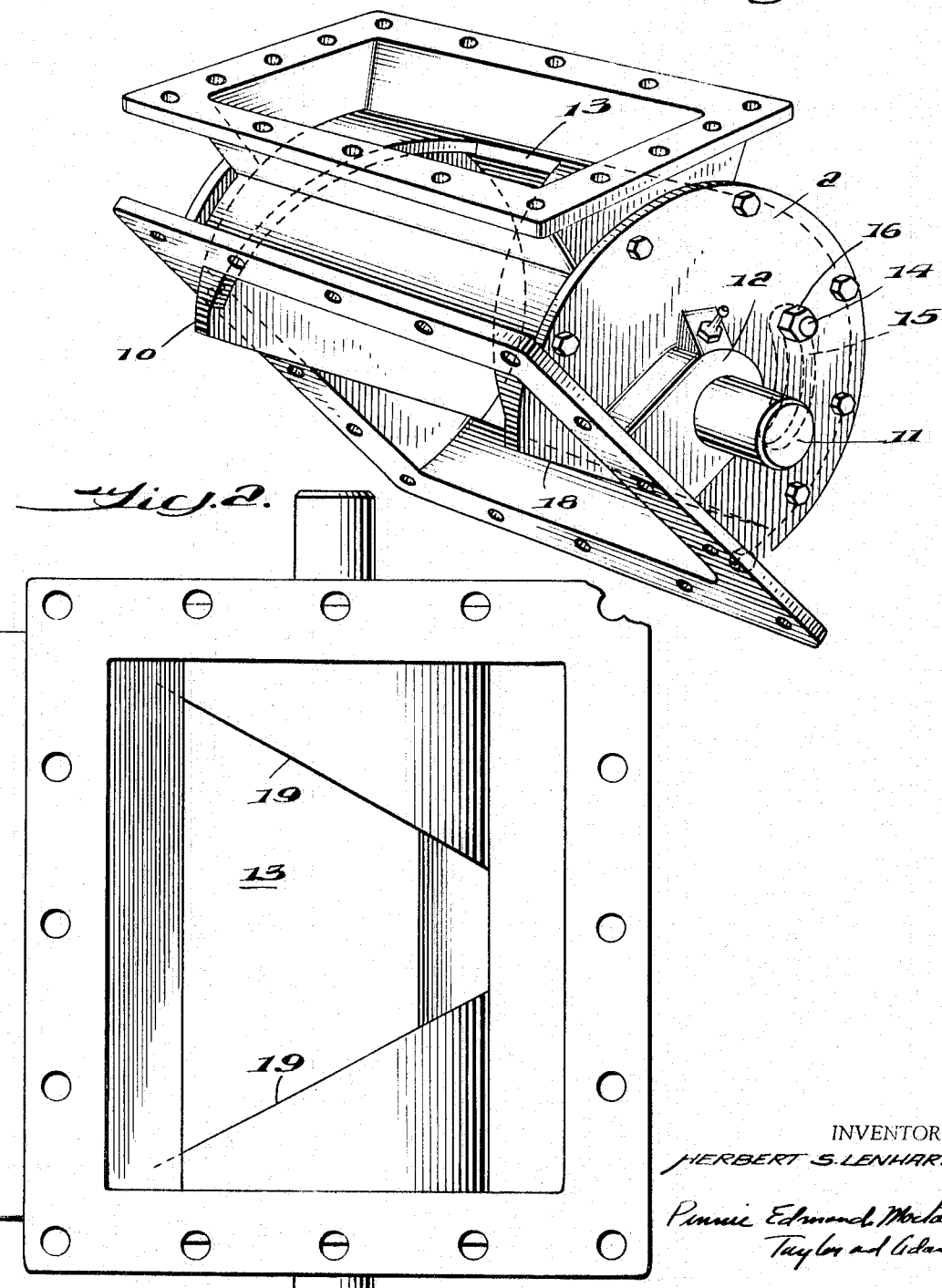

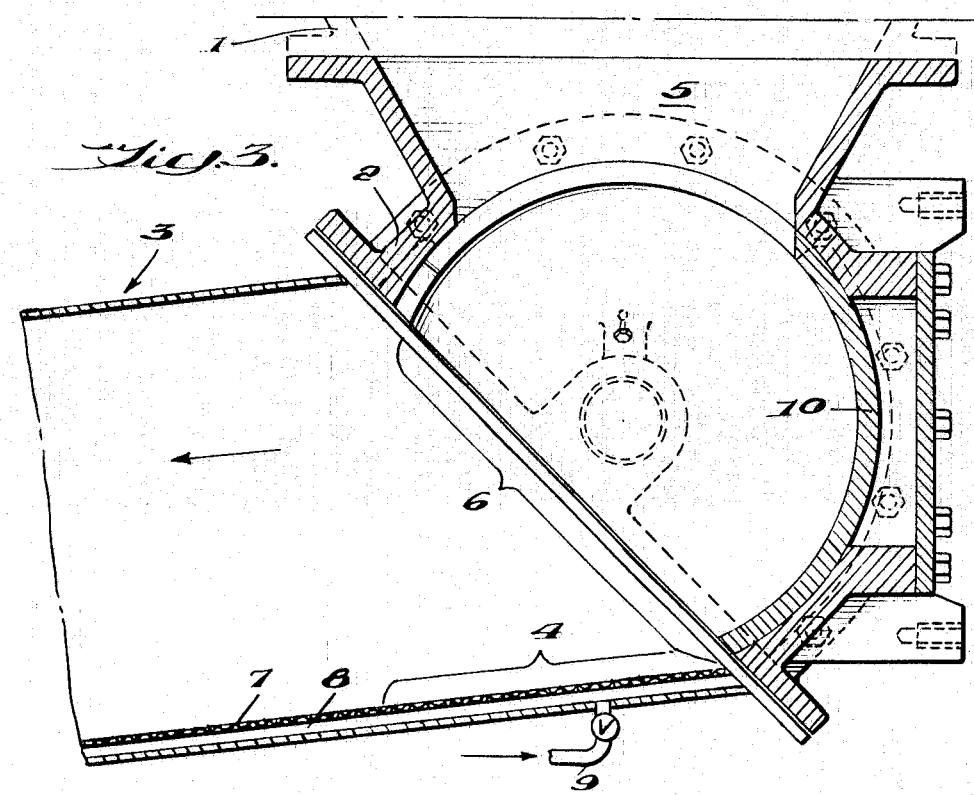
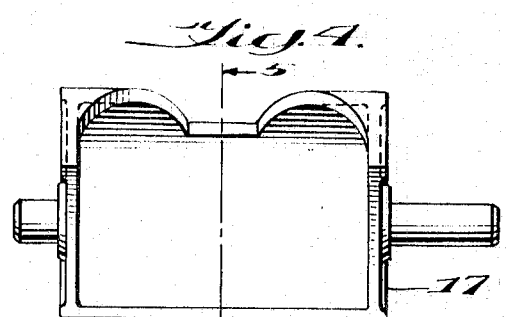
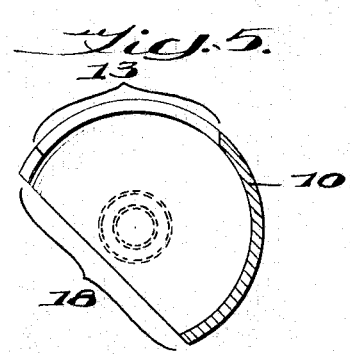
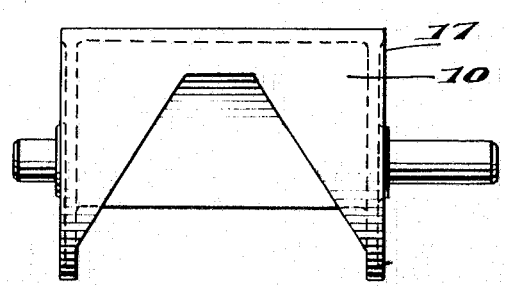
INVENTOR
HERBERT S. LENHART,

ABSTRACT OF THE DISCLOSURE

An apparatus for regulating the feed of pulverulent material from a bin to a conveyor having a generally cylindrical casing and a corresponding generally hollow cylindrical rotary valve which directs material through a material valve inlet from the bin directly through a material valve outlet communicating with a fluidizing section of the conveyor.

---

This invention relates to handling of pulverulent material and is more particularly concerned with the regulation of the flow of such material when it is desired that the rate of movement of the material can be accurately controlled as well as adjusted within wide limits.

It has always been a problem in the prior art to accurately regulate the flow of material discharging from a gravity dispensing bin. Many materials exhibit the tendency to "bridge over," thus interrupting the flow of material through the outlet of the bin. When the bridge breaks, the material suddenly falls through the outlet into the receiving means and creates excessive surges in the flow.

To obviate these problems, devices such as that disclosed in U.S. Patent No. 2,802,698 were conceived. However, it has been found that such techniques have not proved entirely satisfactory.

Since the fabric used within the plenum chamber positioned intermediate the bin and valve, is particularly susceptible to wear, all the material in the bin must be completely removed therefrom if the gas-permeable member is to be replaced.

In accordance with this invention, the rotary valve is so positioned in the system that the gas-permeable membr may be repaired without the need for removing all the contents from the bin.

More particularly, this invention is an improvement over the device disclosed in U.S. Patent No. 2,802,698 and contemplates an apparatus for regulating the feed of pulverulent material from a bin to a conveyor having a valve casing arranged between the bin and conveyor, a rotary valve positioned within said casing and a fluidizing section underlying the rotary valve. The casing carries a material inlet, communicating with the bin, and a material outlet situated below the rotary valve communicating with the fluidizing section. The rotary valve, material inlet and material outlet of the casing are so arranged that material introduced into the bin is capable of flowing by gravity, through the rotary valve onto the fluidizing section of the conveyor.

Other important features will appear from the following description and claim, when considered in connection with the accompanying drawings, in which:

FIG. 1 is a perspective view, partly in section, showing the valve of this invention;

FIG. 2 is the top plan view of the invention;

FIG. 3 is a sectional view of the invention;

FIG. 4 is a view of the rotary valve looking from within the fluidized conveyor when the rotary valve is in a full open condition;

FIG. 5 is a sectional view of the rotary valve along lines 5—5 of FIG. 4; and

FIG. 6 is a view of the rotary valve looking from within the fluidized conveyor where the rotary valve is in a full closed position.

Referring to the drawings, this invention embodies a bin 1, which is directly attached to a valve casing, generally designated by reference numeral 2. At a point remote from the bin 1, there is attached to the valve casing a fluidized conveyor, generally indicated by reference numeral 3. Preferably, a section 4 of the conveyor 3 is arranged directly beneath the valve casing 2. The valve casing is a hollow, generally cylindrical body with closed ends. An opening is provided in the uppermost portion of the casing and a material inlet 5 is mounted about said opening and in communication with the bin 1. The material inlet 5 is rectangular in cross-section and is large enough to allow material, introduced into the bin 1, to fall by gravity directly into the interior of the valve casing 2.

The lower portion of the valve casing is cut away to provide a material discharge outlet 6 which is also rectangular in cross-section and faces in a generally downward and lateral direction towards the conveyor 3, thus enabling material to descend and flow by gravity from the bin 1, through the valve casing 2 and onto the fluidizing section 4 which may comprise the nearer portions of the conveyor 3.

Within the valve casing 2, there is arranged a hollow rotary valve 10. This rotary valve 10 also is generally cylindrical in shape and carries end walls 17. The rotary valve is adapted to rotate within and in contact with the inner surface of the valve casing 2.

The rotary valve 10 is provided on each end wall 17 with a stud shaft 11. The stud shafts are mounted in suitable bearings 12, secured to the side walls of the valve casing. These bearings are so positioned that they cause the outer surface of the rotary valve 10 to bear against the inner surface of the valve casing 2 in order to maintain sliding contact therewith.

A portion of the rotary valve is cut away to provide a rotary valve exit 18 which can be positioned to communicate with the material discharge outlet 6 in the valve casing. The rotary valve is also provided with a rotary valve entry 13 which communicates with the material inlet 5 when the rotary valve exit 18 is in communication with the material discharge outlet 6 in the valve casing. The rotary valve entry 13 is preferably a partial sector-shaped opening cut from the periphery of the rotary valve cylindrical wall. The rotary valve entry 13 carries edges 19 which diverge outwardly towards the rotary valve exit 18. It is thus seen that by selectively positioning the rotary valve entry 13 in communication with the material inlet 5, it is possible to limit the flow of material from the bin through the rotary valve.

The exact shape of the opening or passageway through the rotary valve body, or the dimension thereof, is not important as far as this invention is concerned, but it is preferred to provide an opening through the rotary valve having side walls which converge in a manner similar to that shown in the drawings.

The rotary valve carries a stud 14 which extends outwardly from one side of the rotary valve 10. This stud 14 is adapted to slide within a slot 15 arranged on one side of the valve casing 2. A lock nut 16 is adjustably connected to the stud 14. This lock nut is operable to maintain the rotary valve 10 in a fixed position within the valve casing, if so desired.

In FIGS. 2, 3, 4 and 5, the rotary valve 10 is arranged in a full open position, that is to say, the sector shape opening 13 is directly aligned with the material inlet 5 of casing 2. In this position, maximum flow of material into the fluidized conveyor 3 is accomplished.

The fluidized conveyor 3 comprises a gas-permeable medium 7 over which the pulverulent material is adapted to flow. Immediately below the gas-permeable member 7, there is situated a plenum chamber 8. Air is introduced into the plenum chamber through the valve controlled air pipe 9. The conveyor is a well-known type and is more fully described and disclosed in Schemm Patent No. 2,527,455. As far as the operation of the fluidized conveyor is concerned, it is sufficient to state here that air at relatively low pressure is introduced into plenum chambers and passes upwardly in a fine state of subdivision through the gas-permeable member into the overlying pulverulent material. This aeration of the pulverulent material fluidizes it and causes it to take on pseudo-liquid properties so that it will flow by gravity along the upper surface of the gas-permeable surface.

It will thus be evident that the air flowing from the plenum chamber in the fluidizing section 4 will pass up through the rotary valve and valve casing and into the bin. This not only aids in preventing the material from becoming clogged in the rotary valve, but actually assists in disseminating the material which might possibly otherwise "bridge over" in the bin.

When the rotary valve 10 is in the position as illustrated in FIG. 6, the material flow to the fluidized conveyor 3 is completely stopped since the section of the rotary valve immediately adjacent the rotary valve entry 13 completely closes the material inlet 5. In this closed position, it is then possible to repair the gas-permeable member without the need for removing all the material from the bin.

Various changes may be made in the details of the construction without departing from the spirit of the invention or sacrificing any of the advantages thereof.

I claim:

An apparatus for regulating the feed of pulverulent material from a bin to a conveyor, comprising a generally cylindrical casing arranged between said bin and said conveyor, said casing carrying a material inlet communicating with said bin and a material outlet communicating with said conveyor, a generally hollow cylindrical rotary valve, having end walls, adapted to rotate axially within said casing and positioned directly beneath said material inlet, said rotary valve having a passageway extending between the end walls and through the cylindrical portion of the rotary valve, said passageway having an entry communicating with said material inlet and an exit to simultaneously communicate with the material outlet, said entry defined by edges which diverge outwardly along the cylindrical portion of the rotary valve towards said exit, and a fluidized conveyor section arranged directly beneath the rotary valve to provide communication between the material outlet and the conveyor so that material introduced into the bin flows by gravity through the rotary valve and material outlet onto the fluidizing section.

References Cited
UNITED STATES PATENTS

| | | | |
|---|---|---|---|
| 2,527,455 | 10/1950 | Schemm | 302—29 |
| 2,802,698 | 8/1957 | Krauss | 302—29 |
| 2,804,349 | 8/1957 | Pynor | 302—29 |
| 2,813,630 | 11/1957 | Morrow | 302—29 |

ANDRES H. NIELSEN, *Primary Examiner.*